United States Patent [19]
Grosz

[11] Patent Number: 5,356,295
[45] Date of Patent: Oct. 18, 1994

[54] ANATOMICAL TEACHING TOOL AND METHOD FOR TEACHING ANATOMY

[76] Inventor: Claudia M. Grosz, 553 Lakehurst Rd. Apt. 1-L, Waukegan, Ill. 60085

[21] Appl. No.: 28,697
[22] Filed: Mar. 8, 1993
[51] Int. Cl.⁵ .............................. G09B 23/28
[52] U.S. Cl. ...................... 434/267; 434/272
[58] Field of Search ............ 434/262, 267, 269, 272, 434/274

[56] References Cited

U.S. PATENT DOCUMENTS

| 396,381 | 1/1889 | Yaggy. | |
|---|---|---|---|
| 1,343,141 | 6/1920 | Kenagy | 434/272 |
| 1,641,773 | 9/1927 | Miller | 434/267 |
| 2,678,505 | 5/1954 | Munson. | |
| 3,178,833 | 4/1965 | Gulbransen, Jr. et al. | 434/272 |
| 3,855,714 | 12/1974 | Block. | |
| 4,398,891 | 8/1983 | King | 434/159 |
| 4,822,285 | 4/1989 | Summerville | 434/272 |
| 4,936,696 | 7/1990 | Foster et al. | 434/267 |
| 5,061,188 | 10/1991 | McCollum | 434/267 |

OTHER PUBLICATIONS

Zaadi Doll, Anatomical Products Catalog, p. 130, 1992 ed. Anatomical Chart Co.

*Primary Examiner*—Gene Mancene
*Assistant Examiner*—Jeffrey A. Smith
*Attorney, Agent, or Firm*—Michael, Best & Friedrich

[57] ABSTRACT

A teaching tool and method for teaching anatomy including a model having thereon at least one representation of an anatomical part and a template having therein an aperture that approximates the shape of the anatomical part. The template is superimposed on the model such that the anatomical part is visible through the aperture in the template. Preferably, the template includes indicia thereon describing the name and function of the anatomical part.

12 Claims, 2 Drawing Sheets

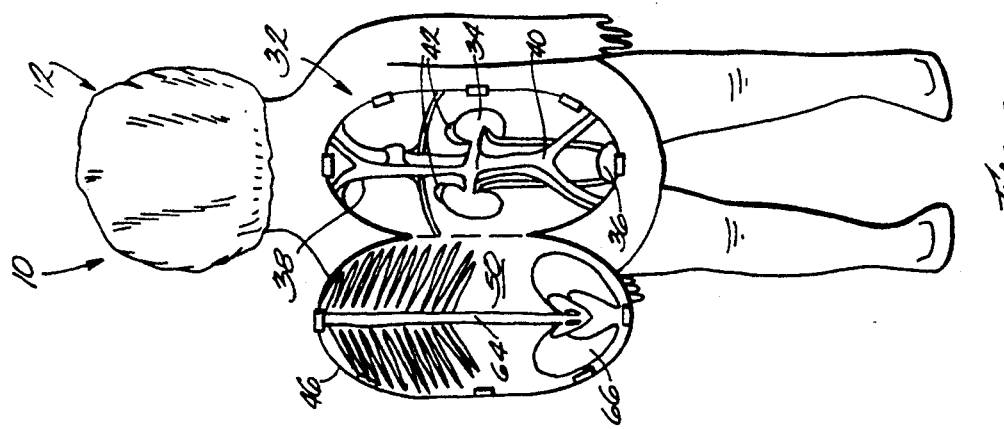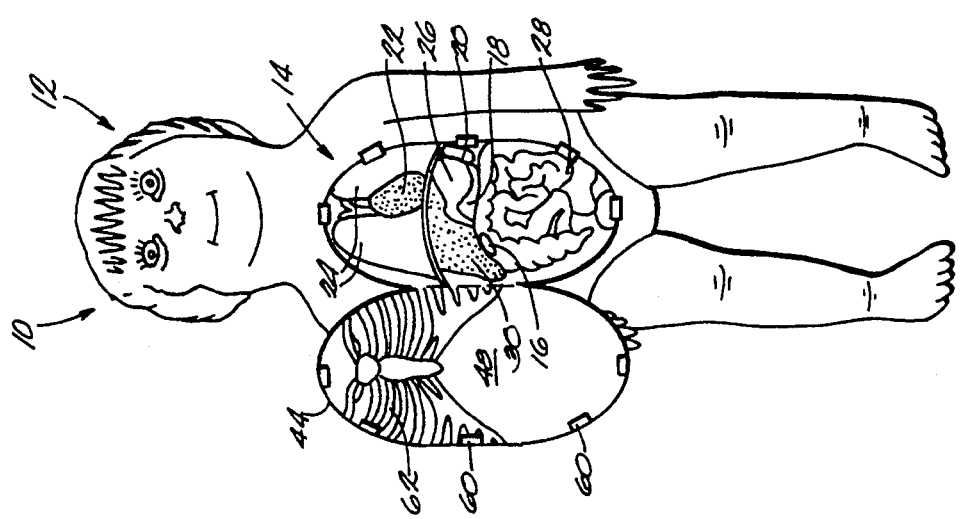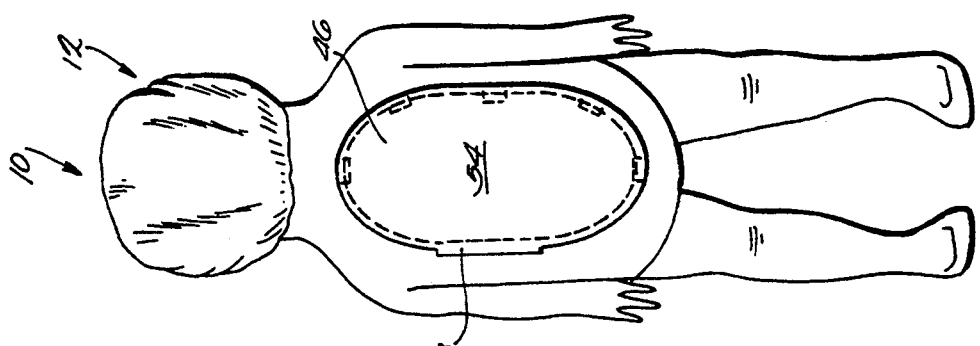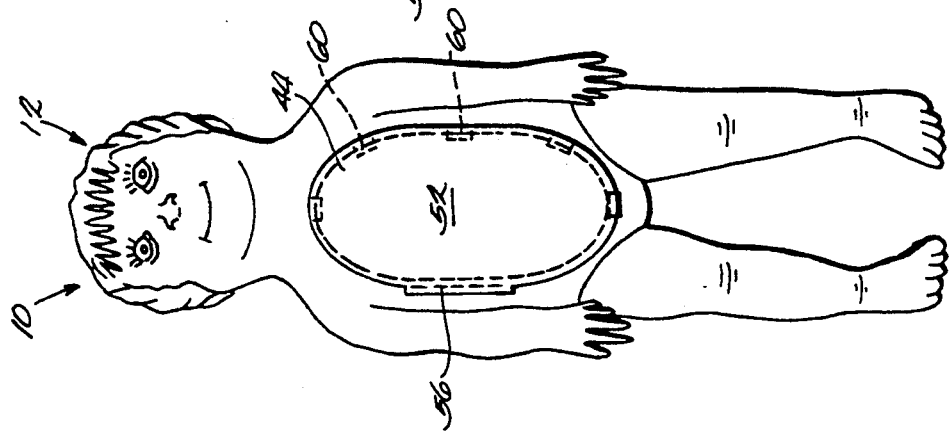

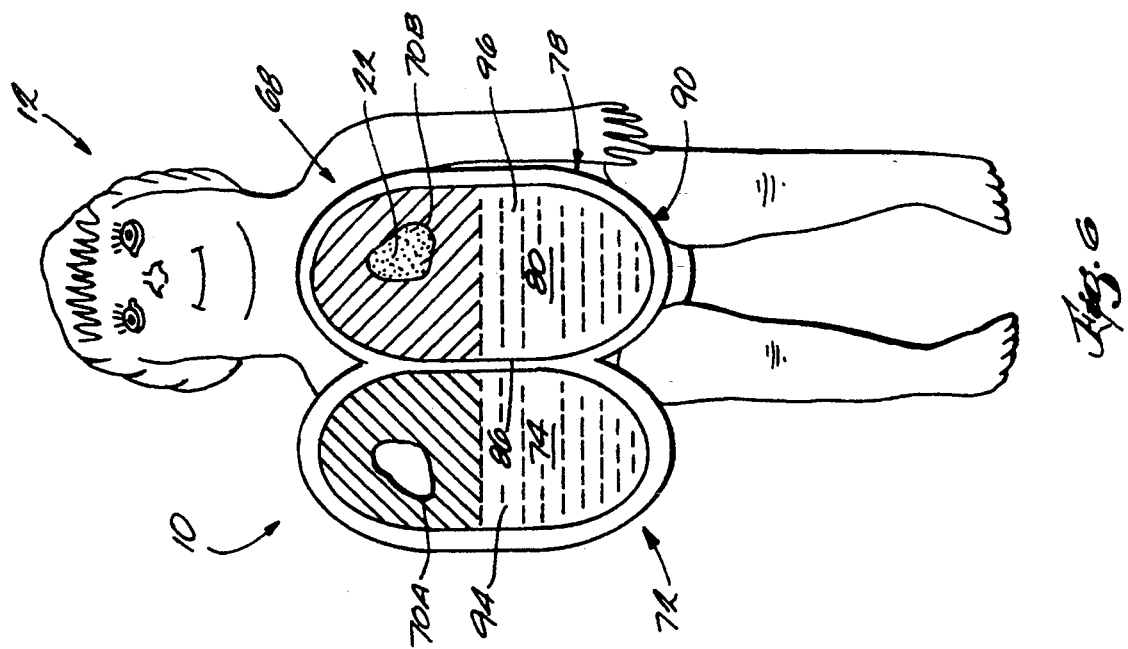
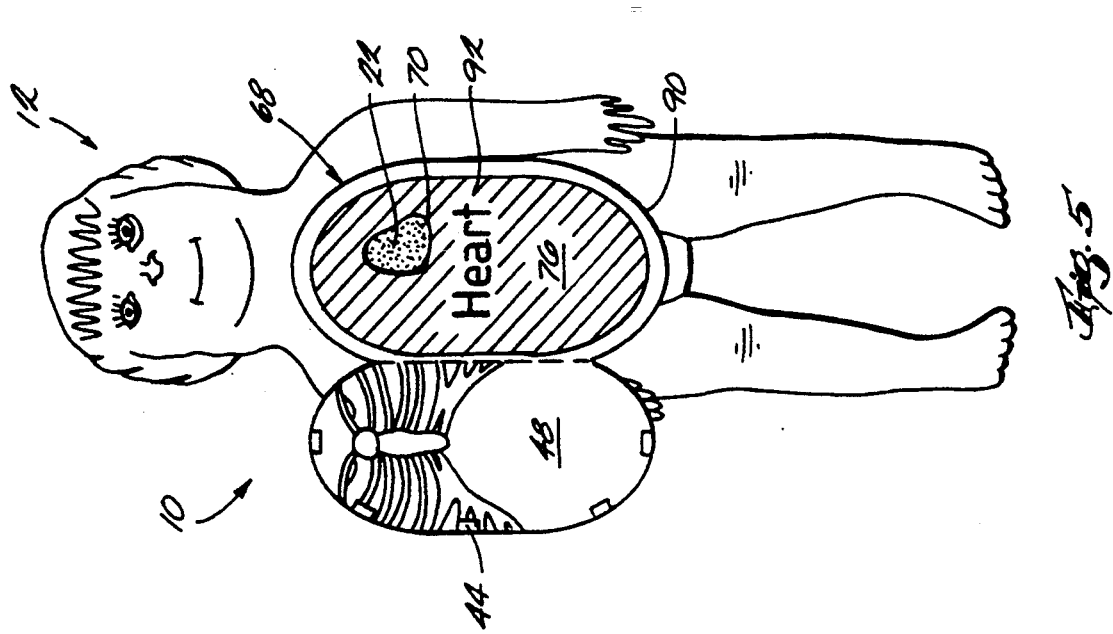

ANATOMICAL TEACHING TOOL AND METHOD FOR TEACHING ANATOMY

FIELD OF THE INVENTION

The invention relates to an anatomical teaching tool and a method for teaching anatomy.

BACKGROUND OF THE INVENTION

Various types of anatomical dolls and models have been used for teaching anatomy. One type is a doll that has representations of anatomical parts thereon and is used as a therapeutic aid. Another type is a doll that has a hollow abdominal cavity which contains various internal organs located in their approximate anatomical correct positions within the cavity. Further, another type is a stuffed toy animal with stuffed fabric internal organs that are removably received in the abdominal cavity. Finally, anatomical charts are also used as teaching tools and methods of teaching anatomy.

SUMMARY OF THE INVENTION

The invention provides a teaching tool and method for teaching anatomy which includes a model having thereon representations of anatomical parts. The teaching tool and method further includes templates having therein apertures that approximate the shape of the anatomical parts. Preferably, each anatomical part has a corresponding template with an aperture therein that approximates the shape of that anatomical part. The template is superimposed on the model such that the anatomical part is visible through the aperture in the template. Preferably, the template also has thereon indicia describing the name and function of the anatomical part.

It is a principle feature of the invention to provide an anatomical model depicting anatomical parts and templates having therein apertures shaped to approximate the anatomical parts. The invention is geared toward teaching anatomy and physiology to children and gives children the opportunity to learn about their bodies. However, the invention can be useful for persons of any age and is a useful aid for parents or teachers in teaching children about the human body and its development. An advantage of the invention is that children using the model and templates will gain the ability to recognize, name and learn the various organs, bone structures and body parts of the human body along with learning their simple functions. Another advantage of the invention is that children can use the model and templates by themselves in identifying and learning about the parts of the human body. A further advantage is that the anatomical parts represented and the information given about the anatomical parts can be tailored to vary specific applications such as different age groups, different body functions or different pathologies encountered by physicians.

BRIEF DESCRIPTION OF THE DRAWINGS

FIG. 1 is a front elevational view of a model embodying the invention showing a front flap in the concealing position;

FIG. 2 is a back elevational view of the model showing a back flap in the concealing position;

FIG. 3 is a view similar to FIG. 1 showing the front flap in the open position;

FIG. 4 is a view similar to FIG. 2 showing the back flap in the open position;

FIG. 5 is a view similar to FIG. 3 showing a template in a first position superimposed on the model; and FIG. 6 is a view similar to FIG. 5 showing the template in a second position superimposed on the model.

DESCRIPTION OF THE PREFERRED EMBODIMENT

Referring to the drawings, a teaching tool or aid for teaching anatomy 10 is illustrated in FIGS. 1 through 5 and includes a model 12. As shown, the model 12 is a doll representing the human body, however, it should be appreciated that the model could represent any other type of anatomy such as a dog. The doll 12 is three-dimensional and has thereon simplified representations of anatomical parts. In the preferred embodiment as depicted, the anatomical parts include representations or depictions of internal organs and internal bone structures, however, it should be appreciated that external organs, external bone structures and any other anatomical parts may also be represented in practicing the invention.

Referring to FIG. 3, the doll 12 includes a front panel 14 which is a representation of the thoracic and abdominal cavities of the human body as viewed from the front of the human body. The front panel 14 is oval in shape and includes simplified representations of human body organs. The body organs that are represented in the front panel 14 include the gall bladder 16, the pancreas 18, the spleen 20, the heart 22, the lungs 24, the stomach 26, the intestines 28, and the liver 30. As shown in FIG. 4, the doll 12 further includes a back panel 32 which is a representation of the thoracic and abdominal cavities of the human body as viewed from the back of the human body. The back panel 32 is oval in shape and includes simplified representations of human body organs. The body organs that are represented in the back panel 32 include the kidneys 34, the bladder 36, the aorta 38, the vena cava 40, and the adrenal glands 42. It should be appreciated that the selection of anatomical parts to be depicted can be varied accordingly to the particular application of the teaching aid. In addition, as depicted in the drawings, the doll is gender neuter. However, the addition of the genitalia organs may be desired for some applications and the addition of a fetus for others.

The doll 12 also includes a front flap 44 that selectively exposes (FIG. 3) and conceals (FIG. 1) the front panel 14 and a back flap 46 that selectively exposes (FIG. 4) and conceals (FIG. 2) the back panel 32. The front and back flaps 44, 46 are not necessary to practice the invention yet provide some realism to the doll. Preferably, the flaps resemble human skin. As depicted, the front and back flaps 44, 46 are oval in shape, have inner surfaces 48, 50 respectively and outer surfaces 52, 54 respectively and are permanently affixed to the doll. The front and back flaps 44, 46 are permanently affixed to the doll at one side of the front panel 14 or back panel 32 respectively by means such as sewing a seam 56, 58 respectively as shown in FIGS. 1 and 2 or by other means such as gluing. Alternatively, the front and rear flaps 44, 46 could be removably affixed to the doll 12 such as by Velcro synthetic fasteners or snaps.

The front and back flaps 44, 46 function to selectively expose and conceal the front and back panels 14, 32 respectively. In the concealing position as shown in FIG. 1, the inner surface 48 of the front flap 44 rests against the front panel 14 and is hidden from view, and the outer surface 52 of the front panel 14 is visible. Similarly, in the concealing position as shown in FIG. 2, the inner surface 50 of the back flap 46 rests against the back panel 14 and is hidden from view, and the outer surface 54 of the back flap 46 is visible. The front and back flaps 44, 46 and the front and back panels 14, 32 all have thereon means for releasably securing the front and back flaps 44, 46 to the front and back panels 14, 32 respectively. In the illustrated embodiment, the means for securing the flaps include spaced sections of Velcro synthetic fasteners 60. To expose the front panel 14, the front flap 44 is pivoted about the seam 56 approximately 180 degrees to a position as shown in FIG. 3. To expose the back panel 32, the back flap 46 is pivoted about the seam 58 approximately 180 degrees to a position as shown in FIG. 4.

Referring now to FIGS. 3 and 4, the inner surfaces 48, 50 of the front and back flaps 44, 46 respectively depict internal bone structures. The inner surface 48 of the front flap 44 has thereon a representation of a rib cage 62. The inner surface 50 of the back flap 46 has thereon representations of a spine 64 and a pelvis 66. The representations of the anatomical parts on the doll 12 are formed by painting the shape of each anatomical part, placing stuffing under the painted surface then stitching the outline of each anatomical part. After being stitched, some anatomical parts are then further stuffed for a more defined shape. The anatomical parts are painted different colors for easier differentiation between parts.

Referring to FIG. 5, the anatomical teaching tool also includes a template 68 as shown on the doll 12 in the illustrated arrangement. A template is preferably provided for every anatomical part that is represented on the doll. Each template has thereon an aperture 70 that approximates the shape of the anatomical part it corresponds to. The template 68 shown in FIG. 5 corresponds to the heart 22. The description of the templates will hereafter be described with reference to the heart template 68 and the use of the template 68 will be shown on the front panel 14. However, it should be appreciated that templates can also be used on the back panel 32, the front flap 44 or the back flap 46 to learn about the anatomical parts thereon.

As shown in FIGS. 5 and 6, the template 68 includes a first portion 72 having inner and outer surfaces 74, 76 respectively and having therein a first aperture 70A. The template 68 further includes a second portion 78 having inner surface 80 and an outer surface (not visible), and having therein a second aperture 70B. The first and second portions 72, 78 are integrally connected to form a hinge 86 for movement between a first position (FIG. 5) and a second position (FIG. 6). As shown in FIG. 5, in the first position, the outer surface 76 of the first portion 72 is visible, the inner surfaces 74, 80 of the first and second portions 72, 78 respectively are opposed and hidden from view, and the outer surface of the second portion 78 is hidden from view and rests against the front panel 14. Also in the first position, the first and second apertures 70A, 70B are in alignment so that the heart 22 on the front panel 14 is visible through the apertures 70A, 70B. To move the template 68 from the first position (FIG. 5) to the second position (FIG. 6), the first portion 72 is rotated about integral hinge 86 approximately 180 degrees such that the inner surfaces 74, 80 of the first and second portions 74, 78 respectively become visible. In the second position, the heart 22 remains visible through the second aperture 70B.

It should be noted that when a template is use in conjunction with the back panel 32 to demonstrate the anatomical parts thereon, the outer surface of the second portion 78 rests against the back panel 32. When a template is used in conjunction with the front flap 44, the outer surface rests against the inner surface 48 of the front flap 44. Finally, when a template is used in conjunction with the back flap 46, the outer surface rests against the inner surface 50 of the back flap 46.

The teaching tool also includes means for aligning the templates on the doll 12 such that the first and second apertures 70A, 70B are positioned above the anatomical part and the anatomical part alone is visible through the apertures 70A, 70B when a template is in the first position. Preferably, the means for aligning the templates on the doll includes the oval shape of the front panel 14, back panel 32, front flap 44 and back flap 46 and the complementary shaped periphery 90 of the first and second portions 72, 78 of the template. To align a template such as heart template 68 on the doll 12, the oval periphery 90 of the template 68 is superimposed over the oval of the front panel 14, back panel 32, front flap 44 or back flap 46 such that only the anatomical part to which the template corresponds such as heart 22 is in alignment with and visible through the first and second apertures 70A, 70B.

As a further teaching element, the templates also include thereon indicia describing the name and function of the anatomical part that the template corresponds to. As shown in FIG. 5, the heart template 68 has indicia 92 on the outer surface 76 of the first portion 72 identifying the name of the anatomical part visible through the first and second apertures 70A, 70B as "Heart". As shown in FIG. 6, the heart template 68 also has thereon indicia 94, 96 on the inner surfaces 74, 80 of the first and second portions 72, 78 respectively describing the function of the anatomical part visible through the second aperture 70B. Examples of such indicia 94, 96 describing the function of the heart 22 include "The heart is a very powerful pump made of muscle." and "When the muscle squeezes it pushes blood through the heart and out to the body.". Indicia included on the templates can be tailored to the amount of complexity desired in the description of that anatomical part.

While the anatomical doll of the invention can have other useful applications in one form of the invention, the doll and templates can be used to teach anatomy and physiology as follows. The model or doll 12 is provided which includes representations of anatomical parts. The front or back panel 14, 32 of the doll 12 is exposed such as the front panel 14 in FIG. 3. Templates are then provided having therein apertures approximating the shapes of anatomical parts. A template such as template 68 corresponding to the heart 22 is selected. The template 68 is then overlaid or superimposed on the doll 12 in one of four locations; on the front panel 14 (FIG. 5), on the back panel 32 (not shown), on the inner surface 48 of the front flap 44 (not shown), or on the inner surface 50 of the back flap 46 (not shown). The anatomical part such as heart 22 that corresponds to the template is visible through the first and second apertures 70A, 70B of the template. Preferably, the name of the anatomical part appears on the template along with the function of that anatomical part. To learn about the function of the anatomical part visible through the template, the template 68 is opened by pivoting the first portion 72 about the integral hinge 86 approximately 180 degrees. The function of the anatomical part is described on the inner surfaces 74, 80 respectively of the template 68. To learn about another anatomical part, a different template is selected and superimposed upon the doll 12 as above.

While a particular embodiment of the invention has been shown and described, it will be obvious to those skilled in the art that changes and modifications may be made therein without departing from the invention in its broader aspects. Therefore, the aim in the claims is to cover all such changes and modifications as fall within the true spirit and scope of the invention.

I claim:

1. A teaching tool for teaching anatomy comprising:
    a doll including a representation of an anatomical part; and
    a template removably overlaid on said doll, said template having therein an aperture that approximates the shape of said representation of an anatomical part such that when said template is moved into a position overlaying said doll, said representation of an anatomical part is visible through said aperture.

2. A teaching tool for teaching anatomy as set forth in claim 1 wherein said doll further includes means for aligning said template on said doll when said template is moved into a position overlaying said doll such that said aperture is positioned above said representation of an anatomical part and said representation of an anatomical part is visible through said aperture.

3. A teaching tool for teaching anatomy as set forth in claim 1 wherein said template has thereon indicia describing the name of said representation of an anatomical part.

4. A teaching tool for teaching anatomy as set forth in claim 1 wherein said template has thereon indicia describing the function of said representation of an anatomical part.

5. A teaching tool for teaching anatomy as set forth in claim 1 wherein said template comprises
    a first portion having an outer and an inner surface and having a first aperture thereon,
    a second portion having an outer and an inner surface and having a second aperture thereon, said outer surface of said second portion rests against said doll when said template is moved into a position overlaying said doll, and
    said first portion and said second portion are pivotally connected for movement between a first position wherein said inner surfaces of said first and second portions are opposed and said representation of an anatomical part is visible through said first and second apertures and a second position wherein said inner surfaces of said first and said portion are not opposed and said representation of an anatomical part is visible through said second aperture.

6. A teaching tool for teaching anatomy as set forth in claim 1 wherein said doll includes representations of the human thoracic and abdominal cavities.

7. A teaching tool for teaching anatomy as set forth in claim 6 wherein said doll further includes a flap pivotally attached to said doll, said flap selectively exposing and concealing said representations of the human thoracic and abdominal cavities.

8. A teaching aid for teaching anatomy comprising:
    a doll representing the human body, said doll including a representation of the human thoracic and abdominal cavities and a plurality of depictions of anatomical parts in said cavities; and
    a template removably overlaid on said doll, said template selected from a group of templates, said group of templates is each separately removably overlayable on said doll and each has therein a separately shaped aperture having a shape approximately the shape of separate ones of said depictions of anatomical parts, whereby when said template is moved into a position which is in alignment with and overlays said doll, said one of said depictions of anatomical parts is visible through said aperture.

9. A method of teaching anatomy comprising the steps of:
    (a) providing a doll representing the human body including at least one representation of an anatomical part;
    (b) providing a template having therein an aperture approximately the shape of one of said at least one anatomical part; and
    (c) superimposing said template on said doll such that one of said at least one anatomical part is visible through said aperture.

10. The method of teaching anatomy as set forth in claim 9 wherein said step of superimposing said template on said doll includes aligning said template on said doll such that said aperture is positioned only above said at least one anatomical part and said at least one anatomical part alone is visible through said aperture.

11. The method of teaching anatomy as set forth in claim 9 wherein said step of providing a template includes providing on said template indicia describing the name of said at least one anatomical part.

12. The method of teaching anatomy as set forth in claim 9 wherein said step of providing a template includes providing on said template indicia describing the function of said at least one anatomical part.

* * * * *